US012075859B2

(12) United States Patent
Che

(10) Patent No.: US 12,075,859 B2
(45) Date of Patent: Sep. 3, 2024

(54) HEATING CONTROL CIRCUIT

(71) Applicant: Shenzhen Kusen Technology Trading Co., Ltd., Guangdong (CN)

(72) Inventor: Erjun Che, Guangdong (CN)

(73) Assignee: Shenzhen Kusen Technology Trading Co., Ltd., Shenzhen (CN)

( * ) Notice: Subject to any disclaimer, the term of this patent is extended or adjusted under 35 U.S.C. 154(b) by 0 days.

(21) Appl. No.: 18/378,651

(22) Filed: Oct. 10, 2023

(65) Prior Publication Data

US 2024/0122277 A1 Apr. 18, 2024

(30) Foreign Application Priority Data

Oct. 13, 2022 (CN) ........................ 202222704365.5

(51) Int. Cl.

| | |
|---|---|
| ***A41D 13/005*** | (2006.01) |
| ***H05B 1/02*** | (2006.01) |
| ***H05B 3/06*** | (2006.01) |
| ***H05B 3/34*** | (2006.01) |

(52) U.S. Cl.

CPC ....... *A41D 13/0051* (2013.01); *H05B 1/0272* (2013.01); *H05B 3/06* (2013.01); *H05B 3/342* (2013.01); *A41D 2400/12* (2013.01); *H05B 2203/014* (2013.01); *H05B 2203/036* (2013.01)

(58) Field of Classification Search

None

See application file for complete search history.

(56) References Cited

U.S. PATENT DOCUMENTS

| | | | | | |
|---|---|---|---|---|---|
| 5,032,705 | A * | 7/1991 | Batcheller | H05B 3/342 219/211 |
| 5,986,243 | A * | 11/1999 | Campf | H05B 3/36 219/211 |
| 7,230,206 | B1 * | 6/2007 | Randall | H05B 1/0272 381/388 |
| 9,794,987 | B2 * | 10/2017 | Hung | H05B 1/0272 |
| 10,893,576 | B2 * | 1/2021 | Strecker | H05B 1/0272 |
| 10,952,478 | B2 * | 3/2021 | Desmeules | A41D 19/0044 |

(Continued)

FOREIGN PATENT DOCUMENTS

| | | | |
|---|---|---|---|
| KR | 102292927 B1 | * | 8/2021 |
| KR | 20210124818 A | * | 10/2021 |

OTHER PUBLICATIONS

KR-102292927-B1, Aug. 2021, An et al., partial translation (Year: 2021).*

KR-102292927-B1, Aug. 2021. Bib data sheet (Year: 2021).*

*Primary Examiner* — Joseph M. Pelham

(57) ABSTRACT

The present application relates to the field of heating clothing, specifically to a heating control circuit. The heating control circuit includes: a main controller, a plurality of heating units and an indicator light button circuit. Each heating unit includes a heating circuit, a heating button circuit and an indicator light circuit. The control end of the heating circuit is connected to the main controller, and the output end of the heating circuit is provided with a heating wire connected to an external heating clothing. The output end of the heating button circuit is connected to the main controller. The input end and the output end of the indicator light circuit are both connected to the main controller. The output end of the indicator light button circuit is connected to the main controller.

8 Claims, 7 Drawing Sheets

(56) References Cited

U.S. PATENT DOCUMENTS

2013/0037531 A1* 2/2013 Gray .................. A41D 13/0051
219/211
2015/0122791 A1* 5/2015 Hung ................... A41D 13/005
219/494
2015/0271873 A1* 9/2015 Gray .................... H05B 1/0272
219/211
2016/0128393 A1* 5/2016 Janda ................. A41D 13/0051
219/211
2017/0332442 A1* 11/2017 Strecker ............... H05B 1/0272
2022/0175058 A1* 6/2022 McIntyre ............. A41D 27/205
2023/0247732 A1* 8/2023 Che .......................... H05B 3/34
219/211

* cited by examiner

HEATING CONTROL CIRCUIT

CROSS REFERENCE TO RELATED APPLICATIONS

The present application claims the benefit of Chinese Patent Application No. 202222704365.5 filed on Oct. 13, 2022, the contents of which are incorporated herein by reference in their entirety.

TECHNICAL FIELD

The present application relates to the field of heating clothing, in particular to a heating control circuit.

BACKGROUND TECHNIQUE

Heating clothing is clothing equipped with a heating device; the heating device in the heating clothing can provide heat to the wearer and help the wearer keep out the cold. In order to facilitate the wearer's manual control, the controller of the heating device is generally provided on the surface of the clothing. For the wearer's convenience, so he can clearly understand the current working status of the heating clothing, the controller of the heating device is usually equipped with an indicator light for identification. However, the existing heating device lacks control of the indicator light and cannot adjust the display status of the indicator light according to the current environment, which makes the heating device have a greater impact on the appearance of the external heating clothing.

Therefore, it is crucial for those skilled in the art to design a heating control circuit with an indicator light control function.

Application Content

The technical problem to be solved by the present application is to provide a heating control circuit to solve the above-mentioned defects of the existing technology.

The technical solution adopted by the present application to solve the technical problem is to provide a heating control circuit. The preferred solution is that the heating control circuit includes: a main controller; a plurality of heating units, each heating unit includes a heating circuit, a heating button circuit and an indicator light circuit; the control end of the heating circuit is connected to the main controller, and the output end of the heating circuit is provided with a heating wire connected to an external heating clothing; the output end of the heating button circuit is connected to the main controller; the input end and the output end of the indicator light circuit are both connected to the main controller;

- an indicator light button circuit, the output end of which is connected to the main controller;
- wherein, the main controller can receive the control instruction from the indicator light button circuit and correspondingly control on/off of the indicator light circuit, and can receive the control instruction from the heating button circuit and correspondingly control the heating mode of the heating circuit.

Wherein, the preferred solution is that the heating control circuit further includes a buck circuit, the voltage input end of the buck circuit is connected to an external power supply, and the voltage output end of the buck circuit is connected to the voltage input end of the main controller, and the control end of the buck circuit is connected to the control end of the main controller.

Wherein, the preferred solution is that the buck circuit includes a power supply pin, a first field effect transistor and an HT7533-33 chip, the input end of the power supply pin is connected to the external power supply, and the drain of the field effect transistor is connected to the power supply pin, the gate thereof is connected to the main controller, the source thereof is connected to the VIN pin of the HT7533-33 chip, and the VOUT pin of the HT7533-33 chip is connected to the VDD pin of the main controller.

Wherein, the preferred solution is that the main controller includes a 2350 chip, the VDD pin of the 2350 chip is connected to the voltage output end of the buck circuit, and the PA3/PWM3 pin of the 2350 chip is connected to the gate of the first field effect transistor.

Wherein, the preferred solution is that the heating circuit includes a second field effect transistor and a heating wire, the heating wire is connected to an external power supply, and the gate and source of the second field effect transistor are connected to the main controller, and the drain thereof is connected to the heating wire.

Wherein, the preferred solution is that the heating button circuit includes a heating button, the output end of the heating button is connected to the main controller, and resistors are provided between the main controllers and the output end of the heating button.

Wherein, the preferred solution is that resistance values of the resistors between the output end of each heating button and the main controller are different.

Wherein, the preferred solution is that the indicator light circuit includes a plurality of LED lights, and the plurality of LED lights are connected to the controller.

Wherein, the preferred solution is that the indicator light button circuit includes an indicator light button, the output end of the indicator light button is connected to the main controller, and resistors are provided between the output end of the indicator light button and the main controller.

Wherein, the preferred solution is that the heating control circuit further includes a signal amplifier, the input end of the signal amplifier is connected to an external power supply, and the output end of the signal amplifier is connected to the main power controller.

The beneficial effect of the present application is that compared with the existing technology, the present application controls the indicator lights on a plurality of indicator light circuits by providing an indicator light button circuit. When the wearer is outdoors, the indicator lights can be turned off in a timely manner, thereby further effectively avoiding the impact of the heating clothing control device on the appearance of the external heating clothing.

DESCRIPTION OF THE DRAWINGS

The present application will be further described below in conjunction with the accompanying drawings and examples. In the accompanying drawings.

DETAILED DESCRIPTION

The preferred embodiments of the present application will now be described in detail with reference to the accompanying drawings.

As shown in FIGS. 1 to 11, the present application provides a preferred embodiment of a heating control circuit.

Figure 1:
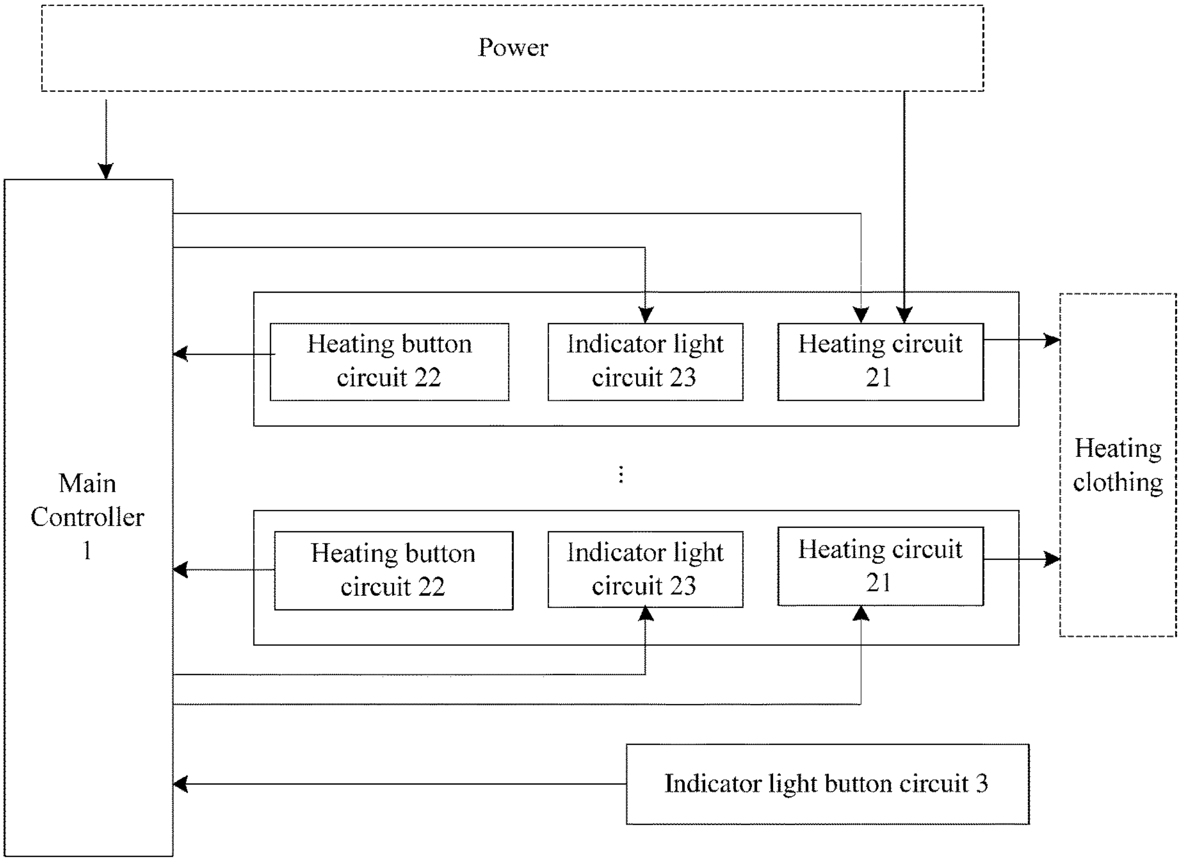
FIG. 1 is a first structural schematic diagram of a heating control circuit in the present application.

Referring to FIG. 1, a heating control circuit includes a main controller 1, a plurality of heating units 2 and an indicator light button circuit 3. Each heating unit 2 includes a heating circuit 21, a heating button circuit 22 and an indicator light circuit 23. The control end of the heating circuit 21 is connected to the main controller 1, and the output end of the heating circuit 21 is provided with a heating wire connected to an external heating clothing. The output end of the heating button circuit 22 is connected to the main controller 1. The input end and the output end of the indicator light circuit 23 are both connected to the main controller 1. The output end of the indicator light button circuit 3 is connected to the main controller 1.

Specifically, the heating circuit 21 is provided with a heating wire connected to the external heating clothing to realize the heating function of the heating clothing. The voltage input end of the heating circuit 21 is connected to an external power supply to obtain the required electrical energy. The voltage output end of the heating circuit 21 is connected to the heating wire, so that the heating wire is powered and heated. The control end of the heating circuit 21 is connected to the main controller 1 to receive the control signal of the main controller 1 and perform different heating modes.

Further, the indicator light circuit 23 is mainly used to display the working status of the heating circuit 21. Both the positive and negative electrodes of the indicator light circuit 23 are connected to the main controller 1. The indicator light circuit 23 can enter different lighting modes according to the control signal of the main controller 1. By presetting the corresponding relationships between the heating modes and the lighting modes in the main controller 1, it is possible to determine the current heating mode according to the current lighting mode.

Further, the heating button circuit 22 is mainly used to turn on or off the heating circuit 21 and perform mode conversion on the heating circuit 21. The output end of the heating button circuit 22 is connected to the main controller 1 for sending button commands. The main controller 1 sends different control signals to the heating circuit 21 according to the received button commands to control the heating circuit 21 accordingly.

Furthermore, the indicator light button circuit 3 is mainly used to turn on or off the indicator light. When the wearer is in a crowded place, the indicator light circuit 23 can be disconnected through the indicator light button circuit 3 and the main controller 1, which can effectively avoid that the indicator light circuit 23 affects the appearance of the external heating clothing when the light is on.

In one embodiment, the heating control circuit includes three heating units 2 to achieve heating of different areas on the external heating clothing.

The existing heating device installed on the heating clothing lacks control on the indicator light and cannot adjust the display status of the indicator light according to the current environment, thus causing the heating device to have a great impact on the appearance of the external heating clothing.

In this embodiment, by providing an indicator light button circuit to control the indicator lights on the plurality of indicator light circuits 23, when the wearer is outdoors, the indicator lights can be turned off in a timely manner, which can further effectively avoid the impact of the heating clothing control device on the external heating clothing.

Figure 2:
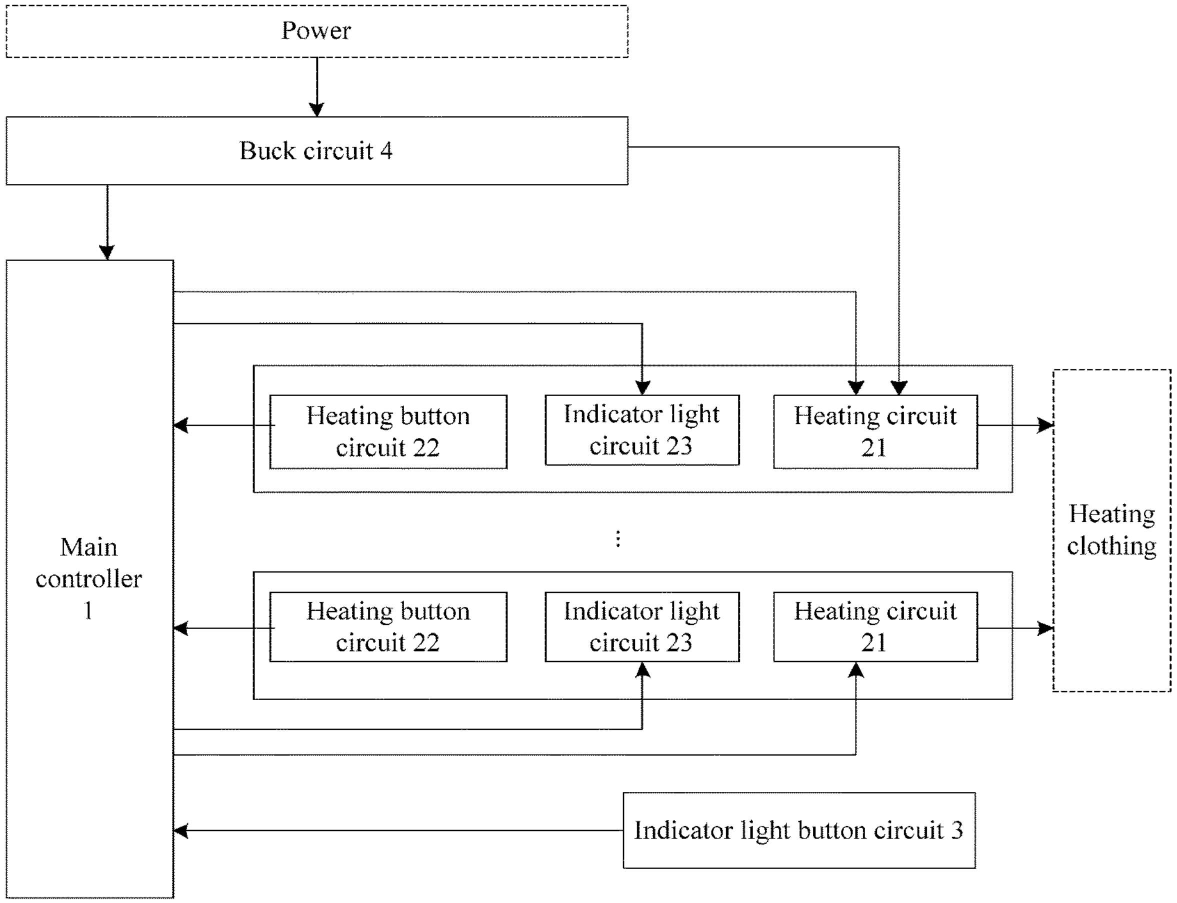
FIG. 2 is a second structural schematic diagram of a heating control circuit in the present application.

In one embodiment, and referring to FIG. 2, the heating control circuit further includes a buck circuit 4. The voltage input end of the buck circuit 4 is connected to an external power supply, the voltage output end of the buck circuit 4 is connected to the voltage input end of the controller, and the control end of the buck circuit 4 is connected to the control end of the main controller 1.

Specifically, the buck circuit 4 is connected to an external power supply to obtain an external voltage. When the buck circuit 4 obtains the external voltage and reduces it, the voltage output end of the buck circuit 4 is connected to the main controller 1 to stably output a voltage of 3.3V to the main controller 1. The control end of the buck circuit 4 is connected to the main controller 1.

Wherein, the control end of the buck circuit 4, the output ends of multiple groups of the heating button circuits 22 and the output end of the indicator light button circuit 3 are all connected to the same control pin of the main controller 1. The main controller 1 can receive the control instructions of the indicator light button circuit 3 and correspondingly control turning on/off of the indicator light circuit 23, and can receive the control instructions of the heating button circuit 22 and correspondingly control heating modes of the heating circuit 21.

Figure 3:
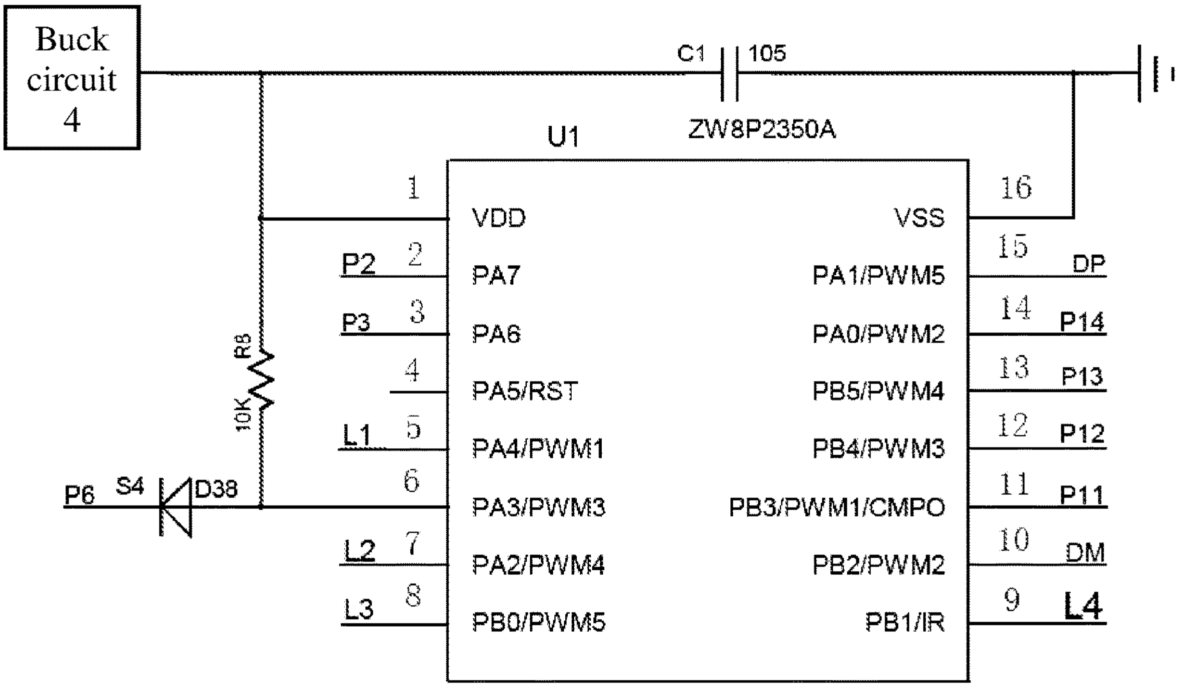
FIG. 3 is a circuit diagram of the main controller in the present application.

In one embodiment, and referring to FIG. 3, the main controller 1 includes a 2350 chip, and the VDD pin of the 2350 chip is connected to the voltage output end of the buck circuit 4.

Specifically, and referring to FIG. 3, the 2350 chip includes PA0/PWM2 pin, PA1/PWM5 pin, PA2/PWM4 pin, PA3/PWM3 pin, PA4/PWM1 pin, PA5/RST pin, PA6 pin, PA7 pin, PB0/PWM5 pin, PB1/IR pin, PB2/PWM2 pin, PB3/PWM1/CMP0 pin, PB4/PWM3 pin, PB5/PWM4 pin, VSS pin and VDD pin; wherein, the VSS pin and the VDD pin are both connected to the voltage output end of the buck circuit 4, and a capacitor C1 is also provided between the VSS pin and the VDD pin, and the capacity of the capacitor C1 is 105 uf.

Figure 4:
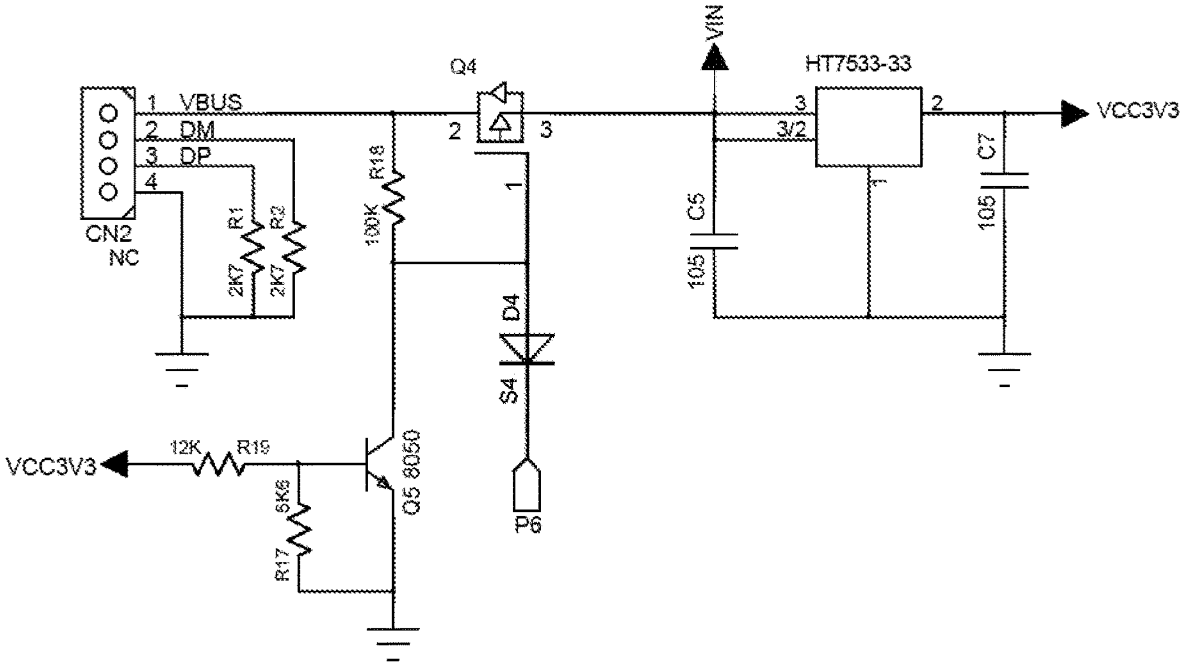
FIG. 4 is a circuit diagram of the buck circuit in the present application.

In one embodiment, and referring to FIG. 4, the buck circuit 4 includes a power supply pin, a first field effect transistor Q4 and an HT7533-33 chip. The input end of the power supply pin is connected to an external power supply. The drain of the first field effect transistor Q4 is connected to the power supply pin, its gate is connected to the PA3/PWM3 pin of the main controller 1, and its source is connected to the VIN pin of the HT7533-33 chip. The VOUT pin of the HT7533-33 chip is connected to the VDD pin of the main controller 1.

Specifically, and referring to FIG. 4, the power supply pins include four pins, which are a ground pin, a DP pin, a DM pin and a VBUS pin. The ground pin, the DP pin and the DM pin are all grounded, and a resistor R1 is provided between the DP pin and the ground wire, and a resistor R2 is provided between the DM pin and the ground wire. The resistances of the resistor R1 and the resistor R2 are both 2.7K.

Further, and referring to FIG. 4, the gate of the first field effect transistor Q4 is connected to the PA3/PWM3 pin of the main controller 1, and a diode D4 is also provided between the gate of the first field effect transistor Q4 and the PA3/PWM3 pin of the main controller 1. The anode of the diode D4 is connected to the gate of the first field effect transistor Q4, and the cathode of the diode D4 is connected to the PA3/PWM3 pin of the main controller 1. The drain of the first field effect transistor Q4 is connected to the VBUS pin of the power supply pin, and the source of the first field effect transistor Q4 is connected to the VIN pin of the HT7533-33 chip.

Figure 5:
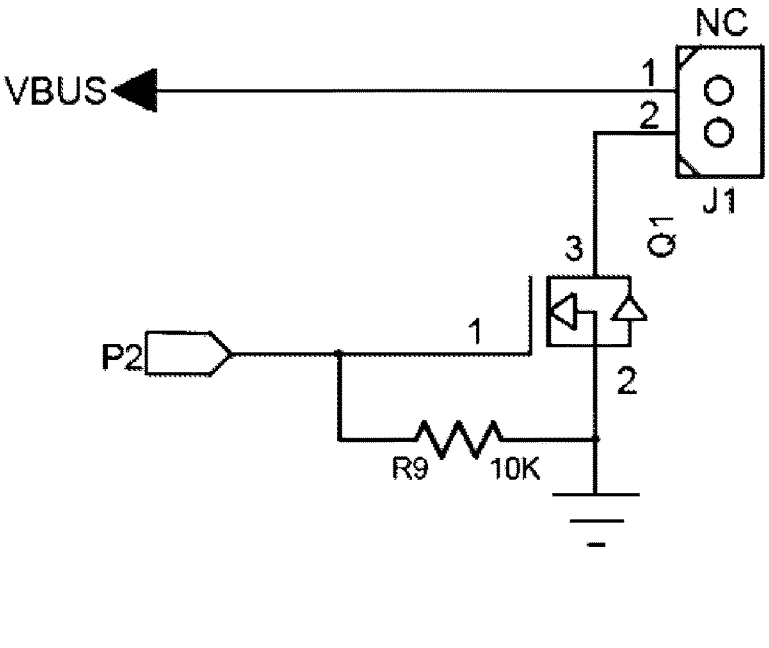
FIG. 5 is a circuit diagram of the first heating circuit in the present application.
Figure 6:
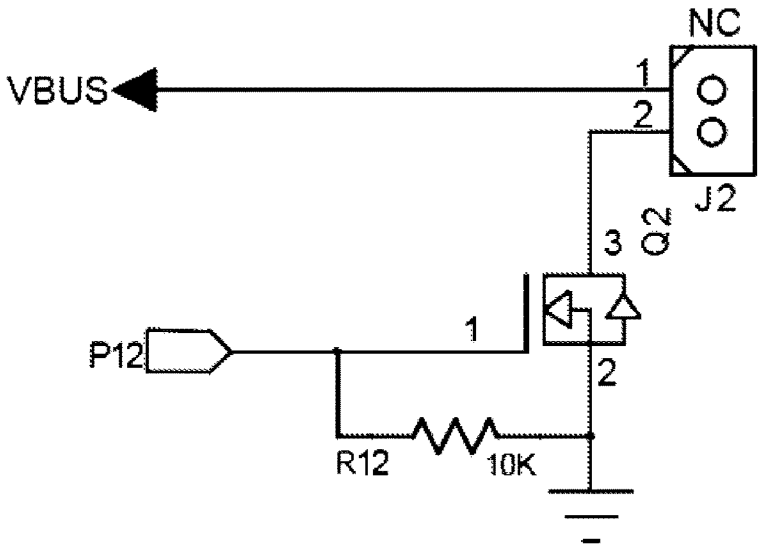
FIG. 6 is a circuit diagram of the second heating circuit in the present application.
Figure 7:
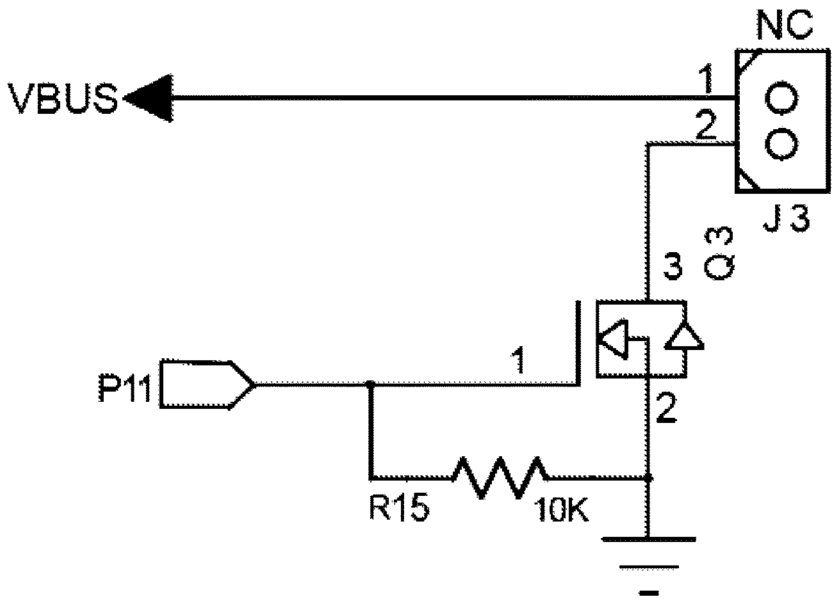
FIG. 7 is a circuit diagram of the third heating circuit in the present application.

In one embodiment, and referring to FIGS. 5 to 7, the heating circuit 21 includes a second field effect transistor and a heating wire. The heating wire is connected to an external power supply. The gate of the second field effect transistor and its source are both connected to the main controller 1, and its drain is connected to the heating wire.

Specifically, the heating control circuit includes three heating units, that is, three groups of heating circuits 21 are included. Referring to FIG. 5, a first heating circuit 21 includes a first field effect transistor Q1 and a heating wire J1. Referring to FIG. 6, a second heating circuit 21 includes a second field effect transistor Q2 and a heating wire J2. Referring to FIG. 7, a third heating circuit 21 includes a third field effect transistor Q3 and a heating wire J3. The drains of the first field effect transistor Q1, the second field effect transistor Q2 and the third field effect transistor Q3 are respectively connected to corresponding heating wires. The source of the first field effect transistor Q1 is connected to the PA7 pin of the main controller 1, the source of the second field effect transistor Q2 is connected to the PB4/PWM3 pin of the main controller 1, and the source of the third field effect transistor Q3 is connected to the PB3/PWM1/CMP0 pin of the main controller 1.

Figure 8:
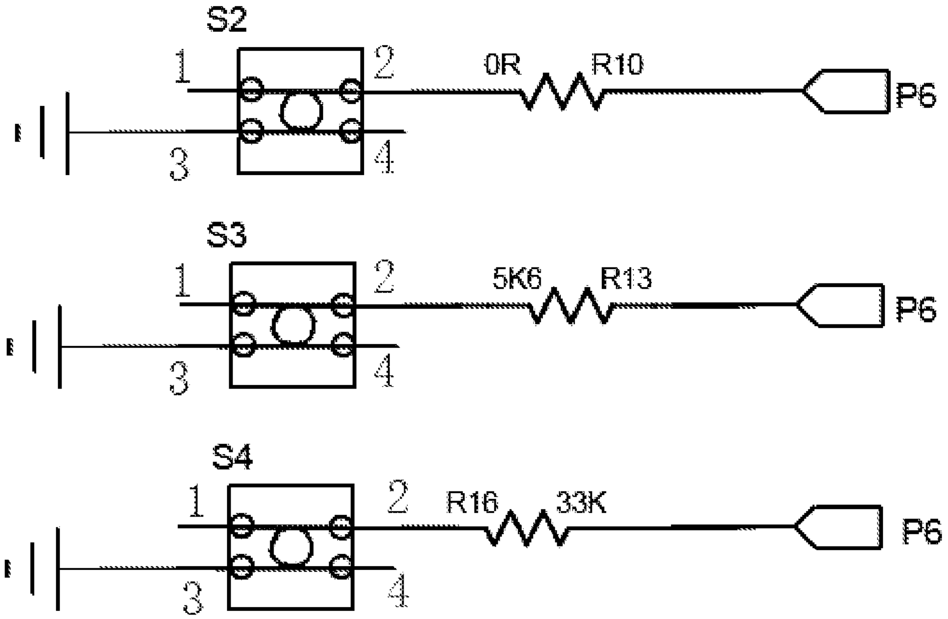
FIG. 8 is a circuit diagram of the heating button circuit in the present application.

In one embodiment, and referring to FIG. 8, each heating button circuit 22 includes a heating button. The output ends of the heating buttons are connected to the main controller 1, and resistors are provided between the output ends of the heating button and the main controller 1.

Specifically, the heating control circuit includes three heating units, that is, three groups of heating button circuits 22 are provided. Referring to FIG. 8, the first heating button circuit 22 includes a button S2, and the second heating button circuit 22 includes a button S3, and the third heating button circuit 22 includes a button S4. The output end of the button S2, the output end of the button S3 and the output end of the button S4 are all connected to the PA3/PWM3 pin of the main controller 1.

Further, and referring to FIG. 8, a resistor R10 is provided between the output end of the button S2 and the PA3/PWM3 pin of the main controller 1, a resistor R13 is provided between the output end of the button S3 and the PA3/PWM3 pin of the main controller 1, and a resistor R16 is provided between the output end of the button S4 and the PA3/PWM3 pin of the main controller 1, where the resistance of R10 is OR, the resistance of R13 is 5.6K, and the resistance of R16 is 33K.

Figure 9:
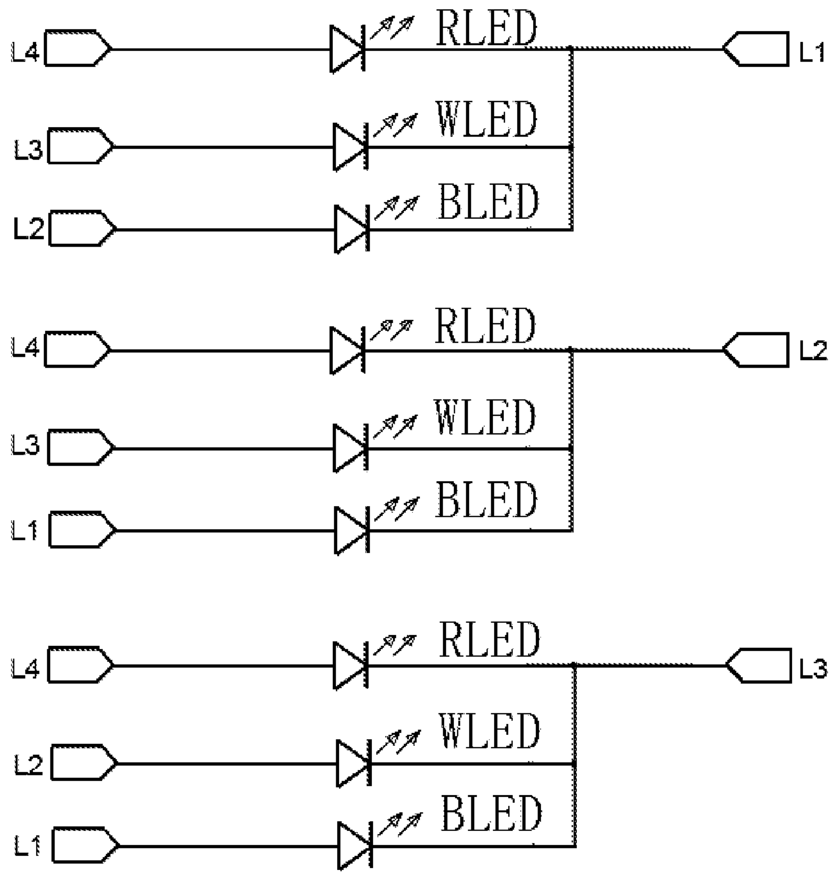
FIG. 9 is a circuit diagram of the indicator light circuit in the present application.

In one embodiment, and referring to FIG. 9, the indicator light circuit 23 includes a plurality of LED lights, and the plurality of LED lights are connected to the controller.

Specifically, the heating control circuit includes three heating units, that is, three groups of indicator light circuits 23 are provided.

Figure 10:
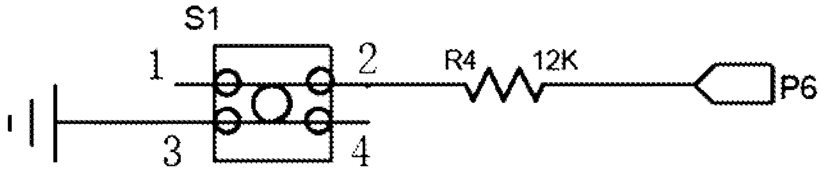
FIG. 10 is a circuit diagram of the indicator light button circuit in the present application.

In one embodiment, and referring to FIG. 10, the indicator light button circuit 3 includes an indicator light button 51, the output end of the indicator light button 51 is connected to the main controller 1, and a resistor R4 is provided between the output end of the indicator light button 51 and the main controller 1, and the resistance of R4 is 12K.

In one embodiment, the heating control circuit further includes a signal amplifier, the input end of the signal amplifier is connected to an external power supply, and the output end of the signal amplifier is connected to the main controller 1.

Figure 11:
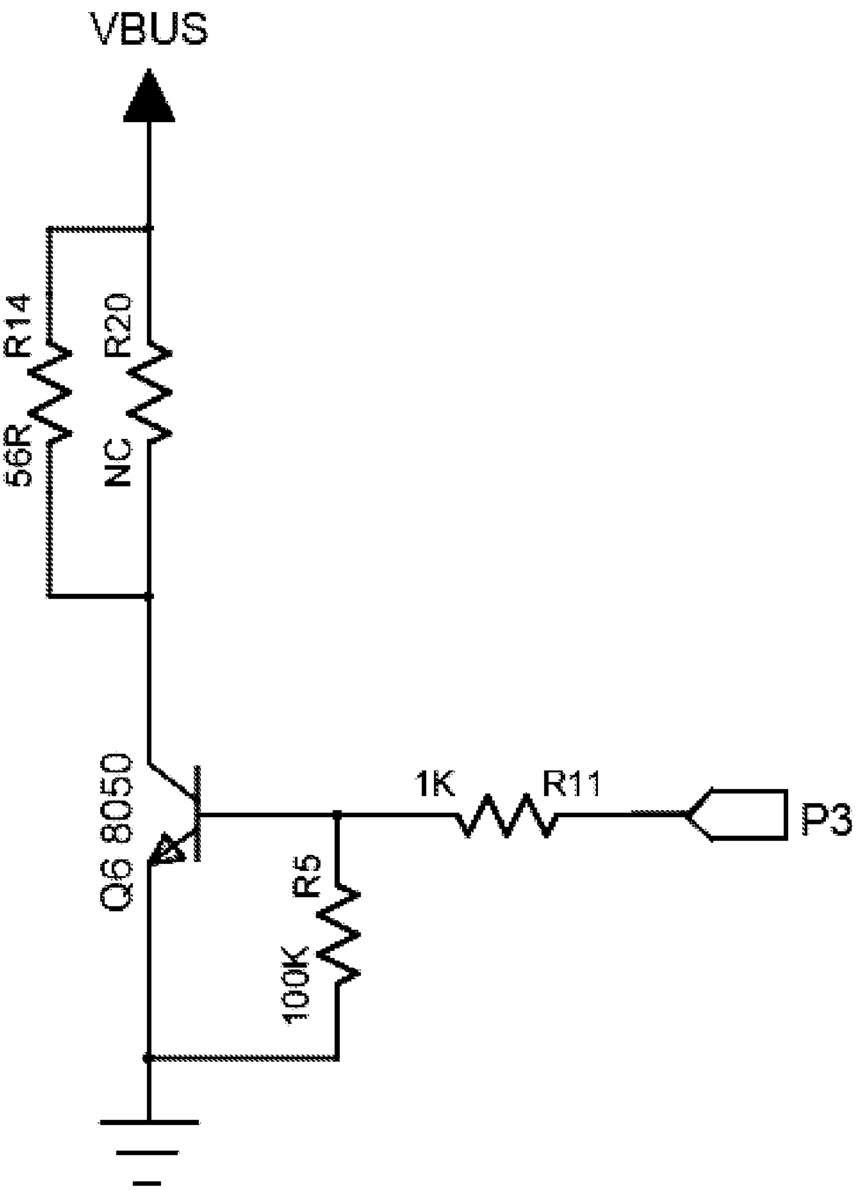
FIG. 11 is a circuit diagram of the signal amplifier in the present application.

Specifically, and referring to FIG. 11, the signal amplifier includes a transistor Q6. The base of the transistor Q6 is connected to the PA6 pin of the main controller 1, the emitter of the transistor Q6 is grounded and the collector of the transistor Q6 is connected to the external power supply.

The above are only the best embodiments of the present application and are not used to limit the scope of the present application. All equivalent changes or modifications made according to the scope of the claims of the present application are covered by the present application.

What is claimed is:

1. A heating control circuit, wherein:

the heating control circuit includes:

a main controller;

a plurality of heating units, each heating unit includes a heating circuit, a heating button circuit and an indicator light circuit;

the control end of the heating circuit is connected to the main controller, and the output end of the heating circuit is provided with a heating wire connected to an external heating clothing;

the output end of the heating button circuit is connected to the main controller;

the input end and the output end of the indicator light circuit are both connected to the main controller;

an indicator light button circuit, the output end of which is connected to the main controller;

wherein, the main controller can receive the control instruction from the indicator light button circuit and correspondingly control on/off of the indicator light circuit, and can receive the control instruction from the heating button circuit and correspondingly control the heating mode of the heating circuit;

wherein the indicator light circuit includes a plurality of LED lights, and the plurality of LED lights are connected to the controller;

wherein the indicator light button circuit includes an indicator light button, the output end of the indicator light button is connected to the main controller, and resistors are provided between the output end of the indicator light button and the main controller.

2. The heating control circuit according to claim 1, wherein: the heating control circuit further includes a buck circuit, the voltage input end of the buck circuit is connected to an external power supply, and the voltage output end of the buck circuit is connected to the voltage input end of the main controller, and the control end of the buck circuit is connected to the control end of the main controller.

3. The heating control circuit according to claim 2, wherein: the buck circuit includes a power supply pin, a first field effect transistor and an HT7533-33 chip, the input end of the power supply pin is connected to the external power supply, and the drain of the first field effect transistor is connected to the power supply pin, the gate thereof is connected to the main controller, the source thereof is connected to the VIN pin of the HT7533-33 chip, and the VOUT pin of the HT7533-33 chip is connected to the VDD pin of the main controller.

4. The heating control circuit according to claim 3, wherein: the main controller includes a 2350 chip, the VDD pin of the 2350 chip is connected to the voltage output end of the buck circuit, and the PA3/PWM3 pin of the 2350 chip is connected to the gate of the first field effect transistor.

5. The heating control circuit according to claim 1, wherein: the heating circuit includes a second field effect transistor and a heating wire, the heating wire is connected to an external power supply, and the gate and source of the second field effect transistor are connected to the main controller, and the drain thereof is connected to the heating wire.

6. The heating control circuit according to claim 1, wherein: the heating button circuit includes a heating button, the output end of the heating button is connected to the main controller, and resistors are provided between the main controllers and the output end of the heating button.

7. The heating control circuit according to claim 6, wherein resistance values of the resistors between the output end of each heating button and the main controller are different.

8. The heating control circuit according to claim 1, wherein: the heating control circuit further includes a signal amplifier, the heating end of the signal amplifier is connected to an external power supply, and the output end of the signal amplifier is connected to the main power controller.

* * * * *